(12) United States Patent  
Nappi

(10) Patent No.: US 9,358,912 B2  
(45) Date of Patent: Jun. 7, 2016

(54) MOTORIZED VEHICLE SADDLE APPARATUS AND METHOD

(71) Applicant: Bryan W. Nappi, Las Vegas, NV (US)

(72) Inventor: Bryan W. Nappi, Las Vegas, NV (US)

(*) Notice: Subject to any disclaimer, the term of this patent is extended or adjusted under 35 U.S.C. 154(b) by 76 days.

(21) Appl. No.: 14/132,162

(22) Filed: Dec. 18, 2013

(65) Prior Publication Data

US 2014/0183911 A1  Jul. 3, 2014

Related U.S. Application Data

(60) Provisional application No. 61/746,177, filed on Dec. 27, 2012.

(51) Int. Cl.
| | |
|---|---|
| *B68G 7/00* | (2006.01) |
| *B21K 21/16* | (2006.01) |
| *B60N 2/64* | (2006.01) |
| *B68G 7/05* | (2006.01) |
| *B60N 2/24* | (2006.01) |
| *B60N 2/40* | (2006.01) |
| *B62J 1/00* | (2006.01) |

(52) U.S. Cl.
CPC *B60N 2/646* (2013.01); *B60N 2/24* (2013.01); *B60N 2/40* (2013.01); *B62J 1/00* (2013.01); *B68G 7/05* (2013.01); *Y10T 29/49716* (2015.01)

(58) Field of Classification Search
CPC .......... B68G 7/00; B68G 7/05; A47C 1/026; A47C 31/023; B60N 2/646; B60N 2/24; B60N 2/40; B62J 1/00; Y10T 29/49716
USPC ................................................ 29/91.1, 401.1
See application file for complete search history.

(56) References Cited

U.S. PATENT DOCUMENTS

| 4,999,068 A * | 3/1991 | Chiarella ........................ 156/78 |
| 2008/0018147 A1* | 1/2008 | Ybarrola ........................ 297/214 |
| 2014/0070576 A1* | 3/2014 | Wu et al. ........................ 297/214 |
| 2015/0175230 A1* | 6/2015 | Baruzzo |

* cited by examiner

*Primary Examiner* — Milton Nelson, Jr.
(74) *Attorney, Agent, or Firm* — Pate Baird, PLLC

(57) ABSTRACT

A seating system for motorized vehicles is adapted to saddles on which riders travel for extended periods of time, such as motorcycles, all-terrain vehicles, and the like. The saddle includes an isolator with a disconnect for lateral vibrations, and a damper for lateral and vertical absorption and isolation of shocks and vibration. A decoupler includes layers separating or uncoupling lateral shear loading from vertical spring loading so vertical forces are not increased by the tension against nearby, laterally displaced material. Cradles provide bolsters to support soft tissue and distribute loads on skeletal structures more evenly at increased area and lower stress. Coverings may include integrating liners, moisture barriers, and an outer wrapper or skin, and may include localized padding.

17 Claims, 13 Drawing Sheets

MOTORIZED VEHICLE SADDLE APPARATUS AND METHOD

RELATED APPLICATIONS

This application claims the benefit of U.S. Provisional Patent Application Ser. No. 61/746,177, filed Dec. 27, 2012, which is hereby incorporated by reference in its entirety.

BACKGROUND

1. The Field of the Invention

This invention relates to seating and, more particularly, to novel systems and methods for saddles attached to motorized vehicles.

2. The Background Art

Vehicles have included seats almost since their beginning. Notwithstanding chariots, in which riders typically stood afoot, most wheeled vehicles rely on a type of seat for a rider. Automobiles devote a considerable portion of their resources to making comfortable seating. Trucks, cars, and so forth have the benefit of space, distance, and weight capacity to support various systems for providing comfortable seating.

In contrast, vehicles that are ridden, such as motorcycles, All-Terrain Vehicles (ATVs), and the like typically have a standardized seating system that is not comfortable for long periods of time in a single seated position.

The standard seating for a motorcycle or ATV involves a pan, typically formed of a molded, rigid plastic onto which is bonded or molded a large block of expanded elastomeric foam. Typically, a high-density, urethane foam may be molded to the shape of a saddle. A cover is placed over the saddle, and secured in place to the pan. The pan is then mounted to a vehicle frame.

Such saddles provide a very uncomfortable ride over a long period of time (longer than one or two hours) for a rider who remains in a single seated position for an extended period of time. For example, a typical cruiser or large road bike is a motorcycle weighing from about four hundred to about nine hundred pounds. With a rider, the suspended weight may exceed one thousand pounds. Typically, the suspension is designed to support the rider and the motorcycle, and thus is not particularly responsive to the weight of the rider.

Meanwhile, the interface between the rider and the motorized vehicle is the saddle, which is typically a covering of leather or synthetic leather on top of a contoured or molded block of urethane foam secured to the pan, in turn connected to the frame. Pressure points are not accommodated. Vibration from the motorcycle is transmitted through the saddle to a user. Shocks or impacts from bumps and irregularities in the road surface are transmitted up through the suspension, the frame, and the saddle to the user, and other problems arise.

What is needed is a saddle that better accommodates the comfort of a user. A rider on an ATV will typically move around much more. Also, many ATV's are comparatively lighter, and closer to the weight of their rider. Thus, their suspensions are more responsive to the rider. However, many are heavier. Thus, what is needed for motorcycle and ATV saddles is a better system for removing the discomfort of a saddle in an extended riding situation.

SUMMARY OF THE INVENTION

In one embodiment, the present invention includes a stackup of various components that are inserted as a core into the original block of foam (pad) of a motorized vehicle saddle. Typically, an excavation of the original saddle pad removes a central core portion directly below a rider. A new perimeter or wall is inserted to line the excavation region. Thereafter, multiple layers are put into the excavation as a new core. The core may include an isolator, which includes a disconnect to disconnect lateral plane vibrations, as well as a damper to damp lateral vibrations and vertical vibrations.

Likewise, the system may rely on a decoupler portion to remove the coupling between lateral stress and vertical stress that would otherwise exist within the original pad. That is, a foam pad, when depressed at any point in any direction is necessarily resisted by all the surrounding material in all three physical dimensions. Thus, a conventional seat or pad on a seat of a motorized vehicle saddle does not decouple the stresses transmitted to a rider in the three dimensions. Accordingly, a decoupler made up of several layers tends to decouple lateral plane forces from vertical forces transmitted.

Meanwhile, the saddle in accordance with the invention includes several cradles. Typically, a conventional saddle does not provide side support or bolstering of the body of a rider. In anatomic terms, the pelvic bone applies direct pressure to soft tissues between it and the saddle. With the saddle pad providing very little deformation, substantial pressure arises at those anatomic pressure points.

Meanwhile, the entire pelvic bone is surrounded below by a large mass of softer tissue. Conventional saddles do nothing to contain the soft tissue, nor rely on it to provide more generalized support over a larger area of the pelvic bone. Accordingly, the cradles provide a certain amount of deformation, limiting, and containing soft tissues, so those soft tissues tend to provide more lateral support and vertical support for the skeletal structures.

This tends to relieve the pressure points. It contains soft tissues in order for them to provide a greater degree of support for the skeletal structures. This provides greater lateral and axial support to skeletal structures than they could receive in a more conventional seat. A cover system may be wrapped around the saddle, making it appear very much as it originally did, but with a very different mechanical performance.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
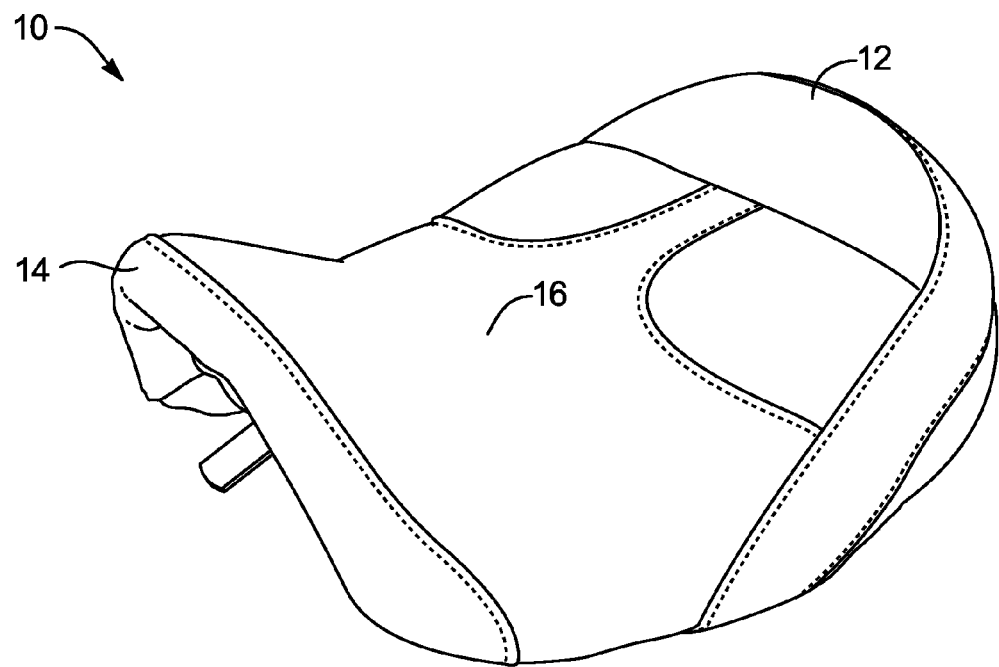
FIG. 1 is a frontal perspective of one embodiment of a saddle in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

Referring to FIG. 1, a saddle 10 for a motorized vehicle may be arranged to provide certain freedom of motion, compactness, comfort, and durability. Typically, a saddle 10 or seating system 10 in accordance with the invention may take on certain appearances shared with other saddles. Typically, a seat for a motorcycle or all-terrain vehicle (ATV) may be referred to as a saddle or a seat. However, the term saddle usually indicates that a rider rides astride the saddle, rather than ensconced as within a seat. In a system 10 in accordance with the invention, a saddle may have various regions serving different functions. For example, a back 12 may be that portion nearest to where a rider's weight is placed. It may extend from a cantle-like containment region forward to a seating region.

Similarly, a seat will typically have a front 14 or front portion 14 adapted to accomplish the objectives of restraining the rider from sliding forward when braking or turning, as well as forming an interface with the frame, fuel tank, or other apparatus on the vehicle. Thus, a certain amount of cushioning may be provided against impact around the front 14 of a saddle 10 or seating system 10.

Typically, a rider will ride on the top of the seat, with the majority of weight of the rider applied thereto. The top 16 may run from the extreme of the back 12 to the extreme of the front 14.

Figure 2:
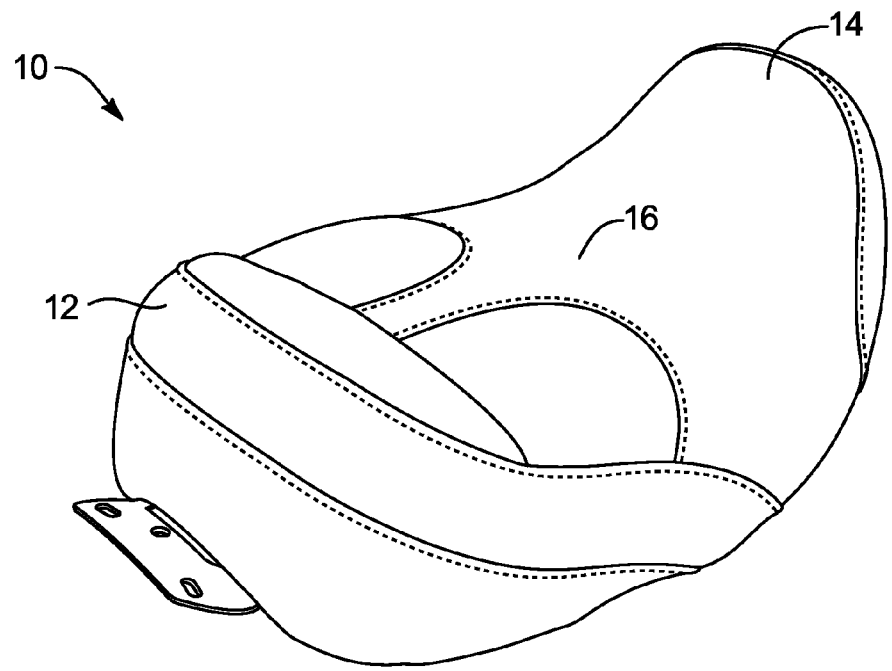
FIG. 2 is a rear quarter perspective view thereof.

Referring to FIG. 2, while continuing to refer generally to FIGS. 1-8, a saddle 10 may include designs, various covering treatments, welting, ventilation, and so forth around the top 16 and other portions thereof. Typically, a cover may include additional padding, and various regions may be provided with differing degrees of softness, support, and so forth.

Figure 3:
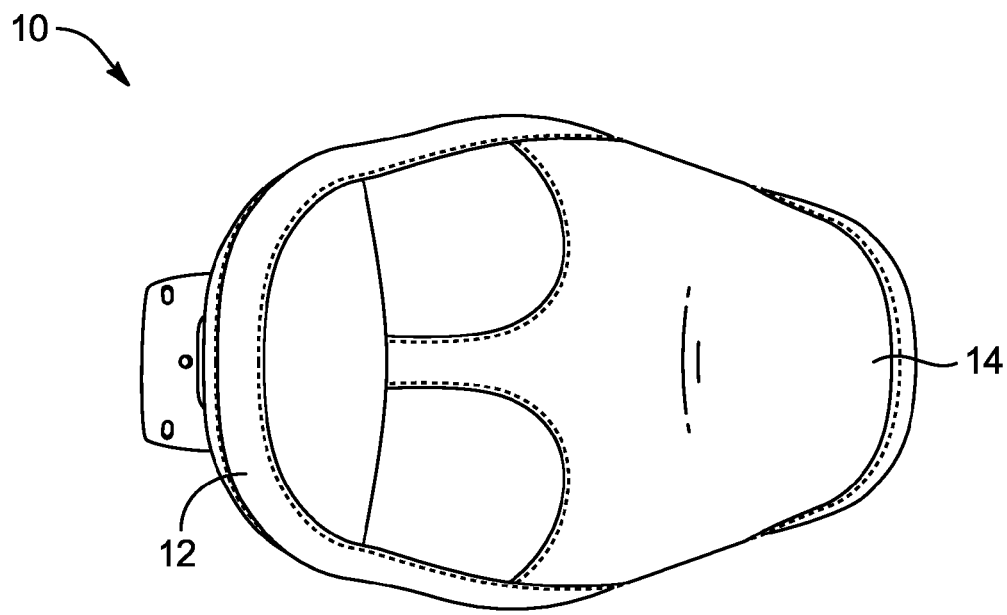
FIG. 3 is a top plan view thereof.
Figure 4:
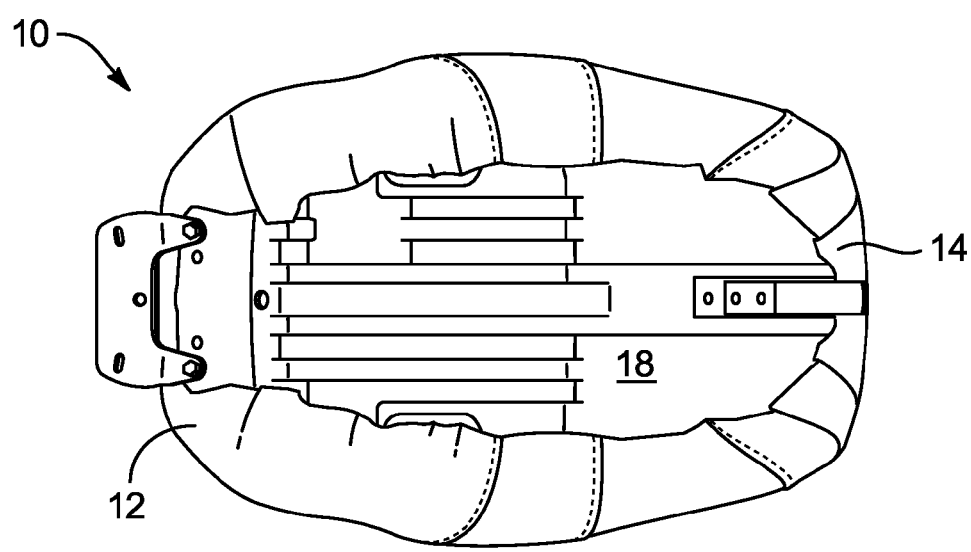
FIG. 4 is a bottom plan view thereof.
Figure 5:
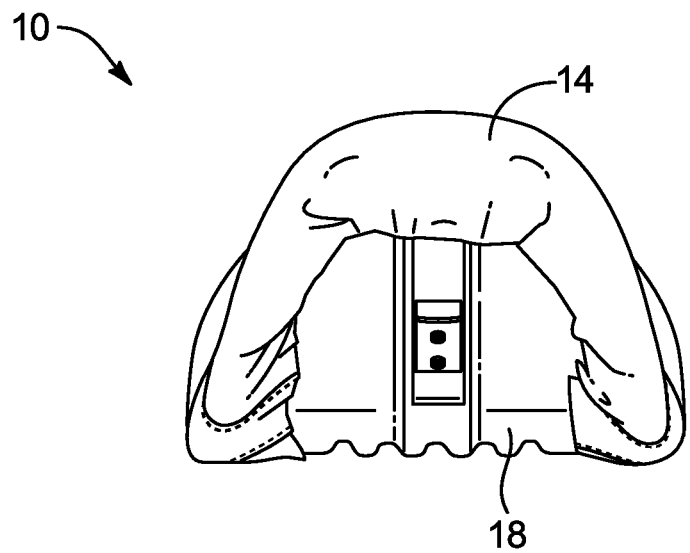
FIG. 5 is a front elevation view thereof.
Figure 6:
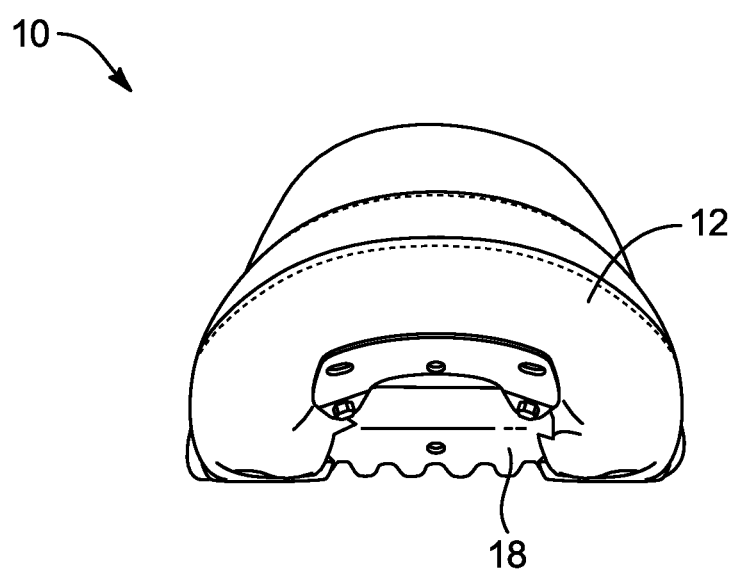
FIG. 6 is a rear elevation view thereof.
Figure 7:
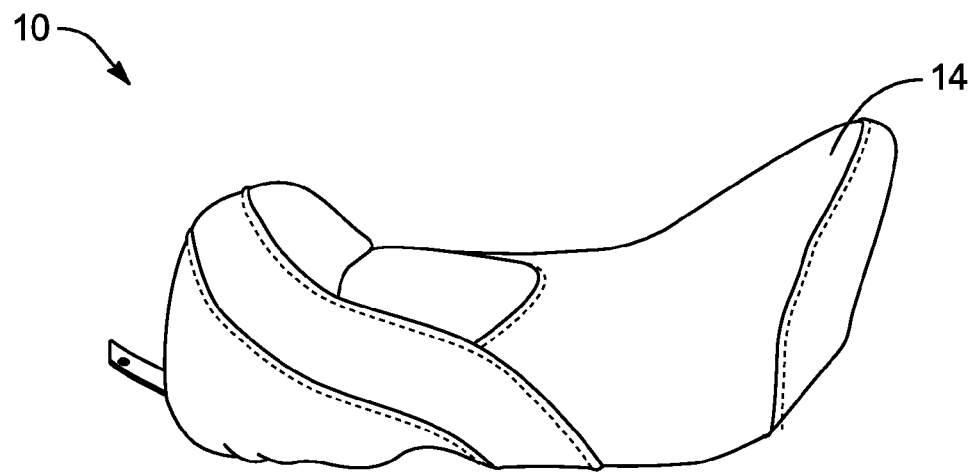
FIG. 7 is a right side elevation view thereof.
Figure 8:
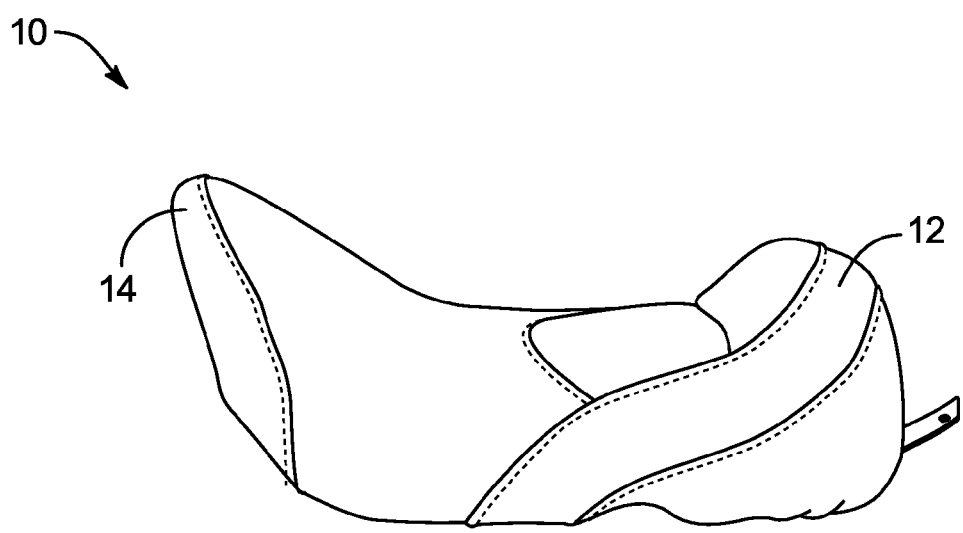
FIG. 8 is a left side elevation view thereof.

FIG. 3, in the illustrated embodiment, shows the division of the top 16 into various regions. Meanwhile, FIG. 4 illustrates the structure of one embodiment of a pan 18 with a covering secured thereto. Meanwhile, FIG. 5 illustrates the rise of the front 14 to interface with the frame or fuel tank and other structural components of a motorized vehicle. In contrast, FIG. 6 illustrates that the rear of the saddle 10 will typically include a rise that is directed more to containment of padding mechanisms for improving the ride for a user. In FIGS. 7 and 8, one can see that the actual external profile of a saddle 10 may share much of the geometry of an equestrian saddle, which predates motorized vehicles.

Figure 9:
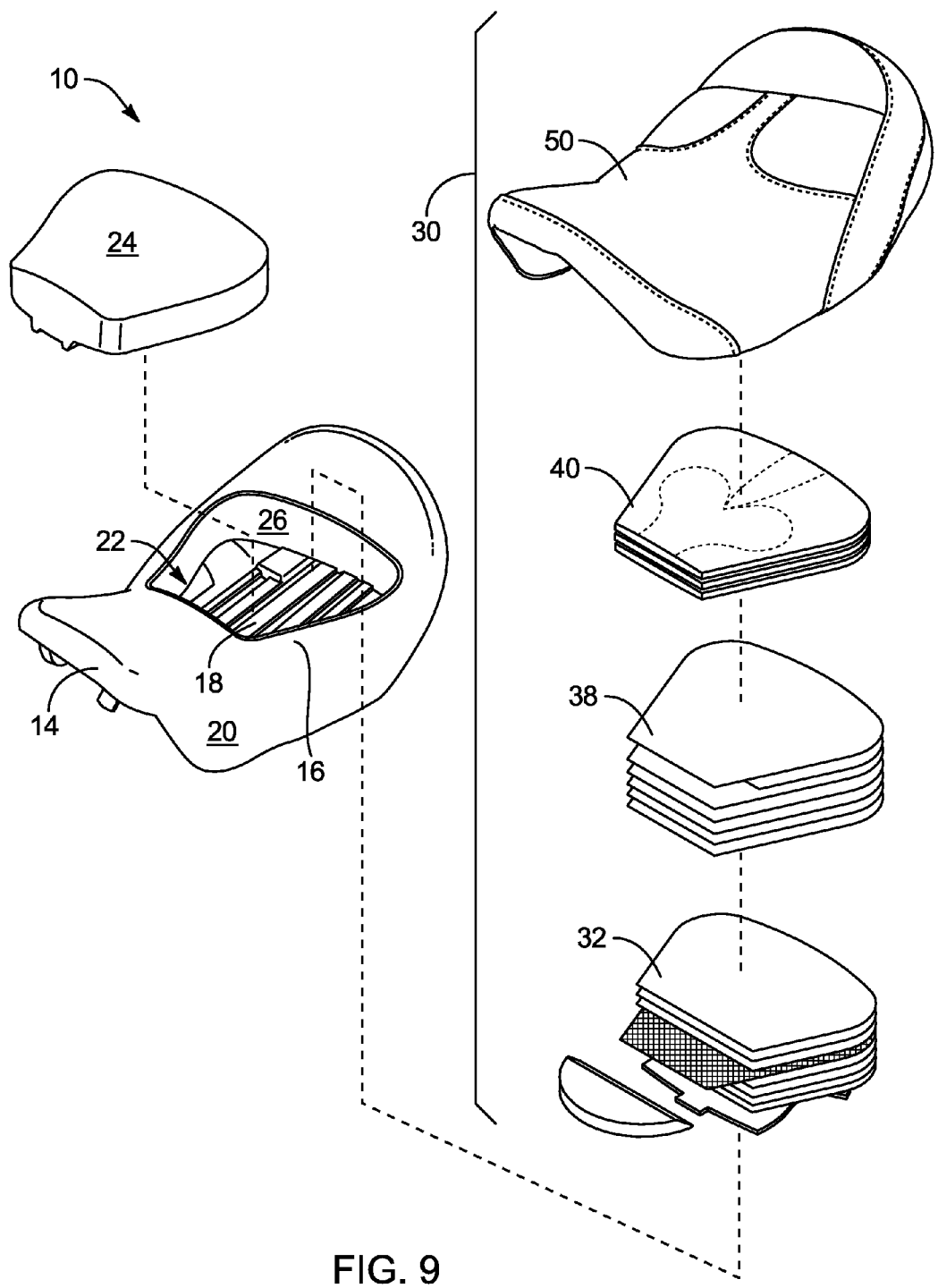
FIG. 9 is a perspective view of one embodiment of a saddle in accordance with the invention excavated to receive the stack of layers forming the new core to improve the comfort of the saddle.

Referring to FIG. 9, while continuing to refer generally to FIGS. 1-12, a saddle 10 may include a pad 20 or block 20 contoured to the general shape of the saddle 10. Typically, the pan 18 is bonded by fastening, gluing, molding, integral formation, or otherwise to the pad 20. Typically, the pan 18 is formed to be of a rigid material. It may be metal, rigid plastic, reinforced composite material (polymer and reinforcement fiber), or the like.

In the illustrated embodiment, an excavation 22 is made in the pad 20 and a section 24 or removed section 24 is taken out. In the illustrated embodiment, the removed portion (section) 24 includes all the material from the top 16 of the saddle 10 down to the pan 18. In other embodiments, a perimeter 26 or wall 26 defining the removed portion 24 need not be vertical, and need not extend all the way from the top 16 down to the pan 18. Nevertheless, in manufacturing, the illustrated embodiment has been shown to be efficient and effective.

As the removed portion 24 has been removed from the excavation 22 or cavity 22 of the pad 20, the wall 26 or perimeter 26 remains. The perimeter 26 or wall 26 defines the remainder of the pad 20 that still exists toward the back 12, the front 14, and both sides of the saddle 10. The portion 24 removed may be calculated to provide the necessary room for the new core 30. By the same token, the perimeter 26 may be defined in such a way as to leave sufficient of the pad 20 beside the core 30 or insert 30 in order to provide additional support for a user, and for stabilizing the insert 30.

Into the cavity 22 is placed a stack of subsystems. The subsystems begin with an isolator 32. The isolator may actually be made of several components. Regardless, the isolator acts to isolate vibration. Large motorcycles are frequently equipped with a V-twin engine. V-twin engines have two pistons offset at 45 degrees from one another. This is a system popularized by the Harley Davidson™ motorcycle company. The style has been adopted. However, such a configuration tends to produce substantial vibration due to the non-symmetric power stroke of each piston.

Moreover, the two power strokes tend to come about 45 degrees apart with motion of the crankshaft, with the attendant addition of energy and subsequent reaction of the engine and motorcycle. Thus, the isolator 32 goes here provides isolation of the vibrations that are otherwise transmitted. The isolator 32 is very effective at isolating lateral motion. Lateral motion is motion within a plane substantially perpendicular to a vertical axis. Lateral may also be used to mean to the left or right side, but the lateral plane is a plane that extends forward, backward, left, and right from a vertical axis. Again, such directions are relative. A pan 18 of a saddle 10 is not necessarily horizontal at any particular location. Nevertheless, it is oriented more or less horizontally, and the rider sits with the spine more or less vertically (axially) oriented.

The isolator 32 is tasked with isolating vibration particularly well in a horizontal plane or a lateral plane. It also may include components that tend to isolate vertically. Moreover, the isolator 32 includes systems to dampen or to remove energy of motion inelastically. Thus, the isolator 32 also tends to dampen motion and remove the energy of motion, rather than transmitting it from the motorcycle frame through the saddle 10 to a rider.

Above the isolator 32 is the decoupler 38. The decoupler 38 is formed of several layers. A benefit of the decoupler 38 is that it provides elastic support by way of various layers of foamed materials. Foam is a colloquial term for expanded polymer materials. Expanded polymers are formed of resins that are reacted or molded with large volumes of included gases, which defines cells.

Expanded polymers may be open cell or closed cell. That is, the gases may be captured within closed volumes of the polymer or the volumes may be interconnected. For example, expanded polyethylene (EPE) is typically a closed-cell foam. In contrast, many urethane foams are open-cell. Thus, liquids, vapors, or generally fluids, will not pass through a closed-cell foam. However, they will readily pass through open-cell foams.

The decoupler 38 provides the spring value of captured gases in closed-cell expended polymer layers. However, the polymer layers are not bound together, and thus may move laterally independently from one another.

This will be explained in detail hereinbelow, but suffice it to say that the decoupler 32 decouples vertical (axial) motion from lateral motion that would otherwise exist in the pad 20 of the saddle 10. That is, pressure applied with a probe pushing into the material of the pad 20 will be resisted by the material directly below it. However, upon penetrating some distance by deflecting or depressing the material, a probe will soon be resisted by a tensile force applied from surrounding material.

Thus, not only does the spring constant of proportionality (in F=kx) of the foamed material come into play, but the coupled tensile forces from adjacent regions also tend to resist the force of the probe. Thus, if that probe is part of a pelvic bone structure pressing on a saddle 10 through the soft tissues of a rider, considerable discomfort can occur over a short period, and certainly over a long period, of time. The decoupler 38, however, does not permit, or substantially resists and reduces, coupling of a horizontal force tending to couple to a vertical force.

The cradles 40 provide support for soft tissue. In addition to pelvic bone structures that support a user, soft tissues support the pelvic structure. By containing soft tissue, rather than allowing it to deflect and deform around a saddle 10, the cradles 40 or the cradles section 40 made up of three cradles 42, 44, 46 provides lateral support for soft tissues, thereby providing more soft tissues below and beside the pelvic skeletal structure, thus proving a greater distribution of a users weight over a larger area of the saddle 10. Meanwhile, support for the skeletal structure comes from more volume and area of soft tissue than that small quantity of soft tissue directly between the skeletal protrusions and the saddle 10.

For appearance, weather protection, integration, and other protective functions, a cover 50 will typically envelop the entire pad 20 of the saddle 10. As discussed hereinbelow, the cover 50 or cover system 50 also includes several layers in certain embodiments in order to accomplish multiple functions. Typically, the cover 50 may be formed of a fluid-impervious material, or may be comprised of a fabric-reinforced polymeric material, or a breathable material such as leather, fabric, or the like.

Referring to FIGS. 10A through 10F, while continuing to refer generally to FIGS. 1 through 12, a saddle 10 or seating system 10 in accordance with the invention may include various embodiments. These embodiments may include one or more layers in an overall stackup 30 or core 30 inserted into the cavity 22 formed in the pad 20 of the saddle 10. In one embodiment, the various layers may be grouped by certain functional characteristics provided.

Figure 10A:
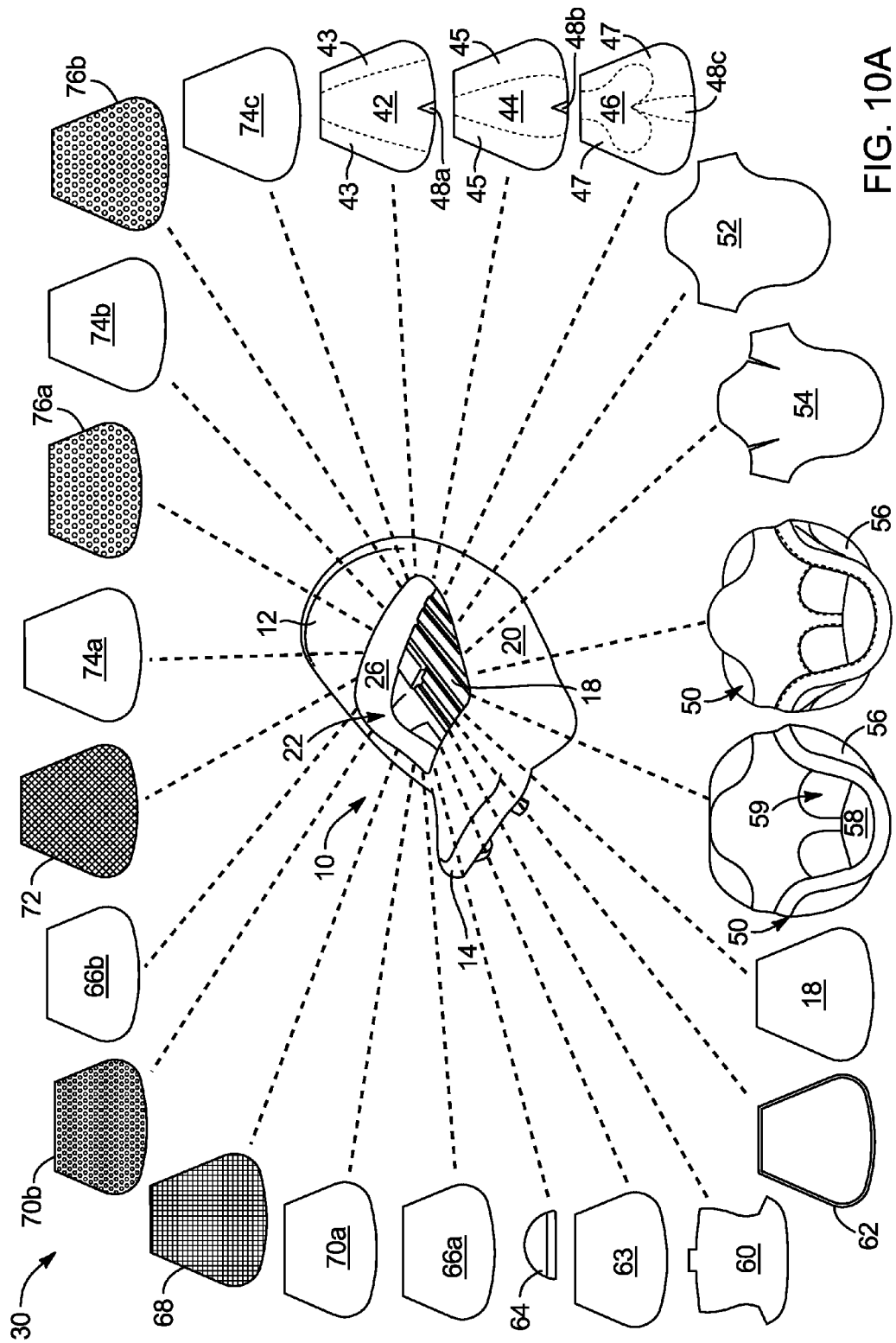
FIG. 10A is an exploded view thereof, showing the individual layers in one embodiment.
Figure 10B:
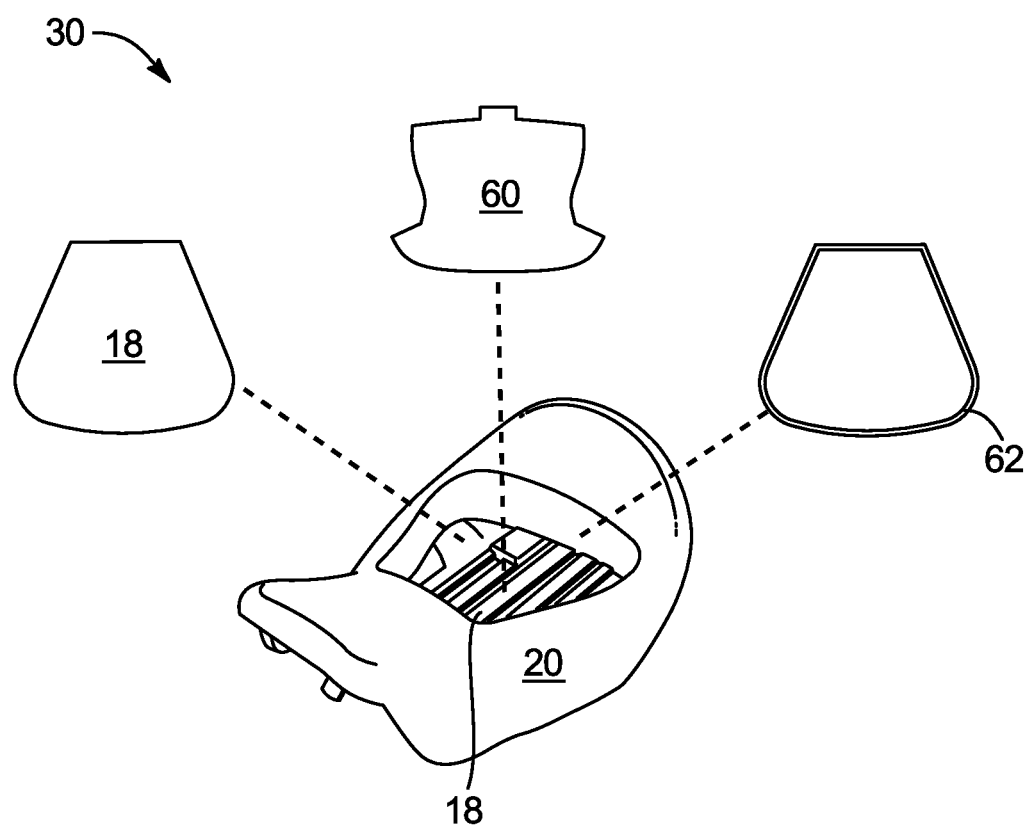
FIG. 10B is an exploded view of the layers forming the disconnect portion of the isolator of the saddle.
Figure 10C:
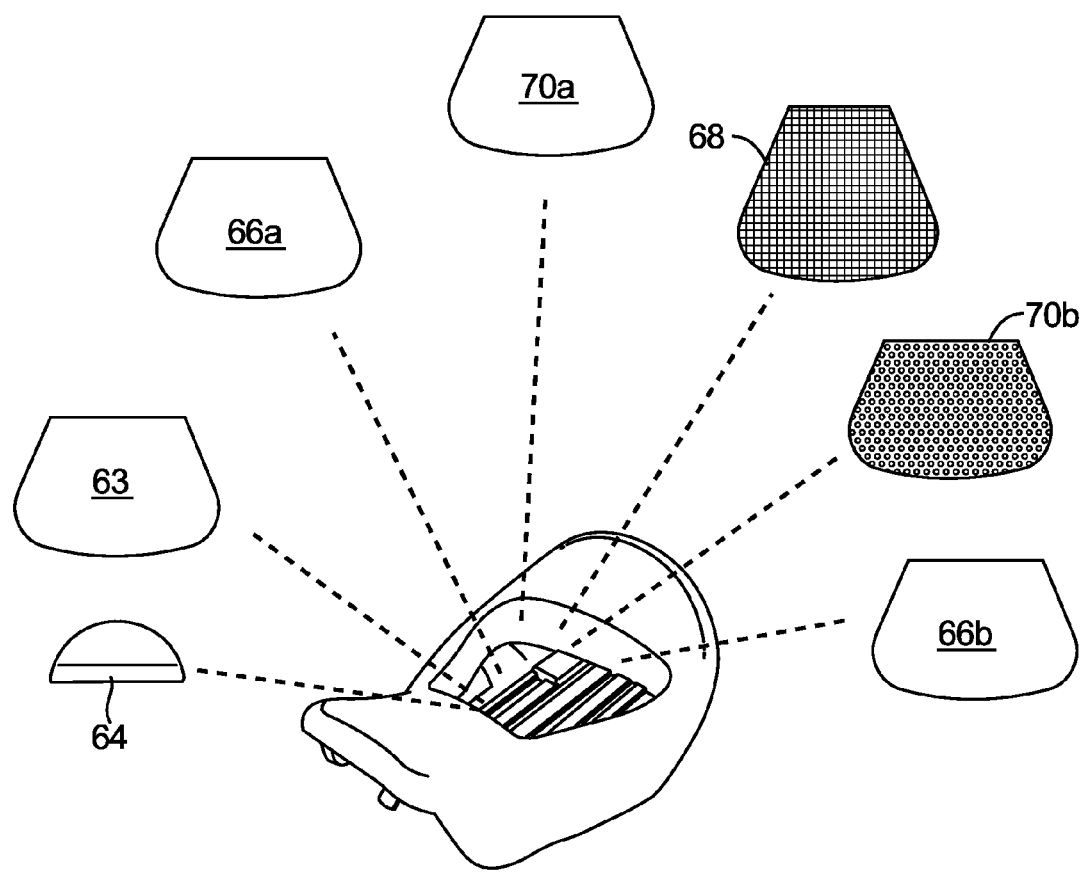
FIG. 10C is an exploded view illustrating the damper portion of the isolator of the saddle.
Figure 10D:
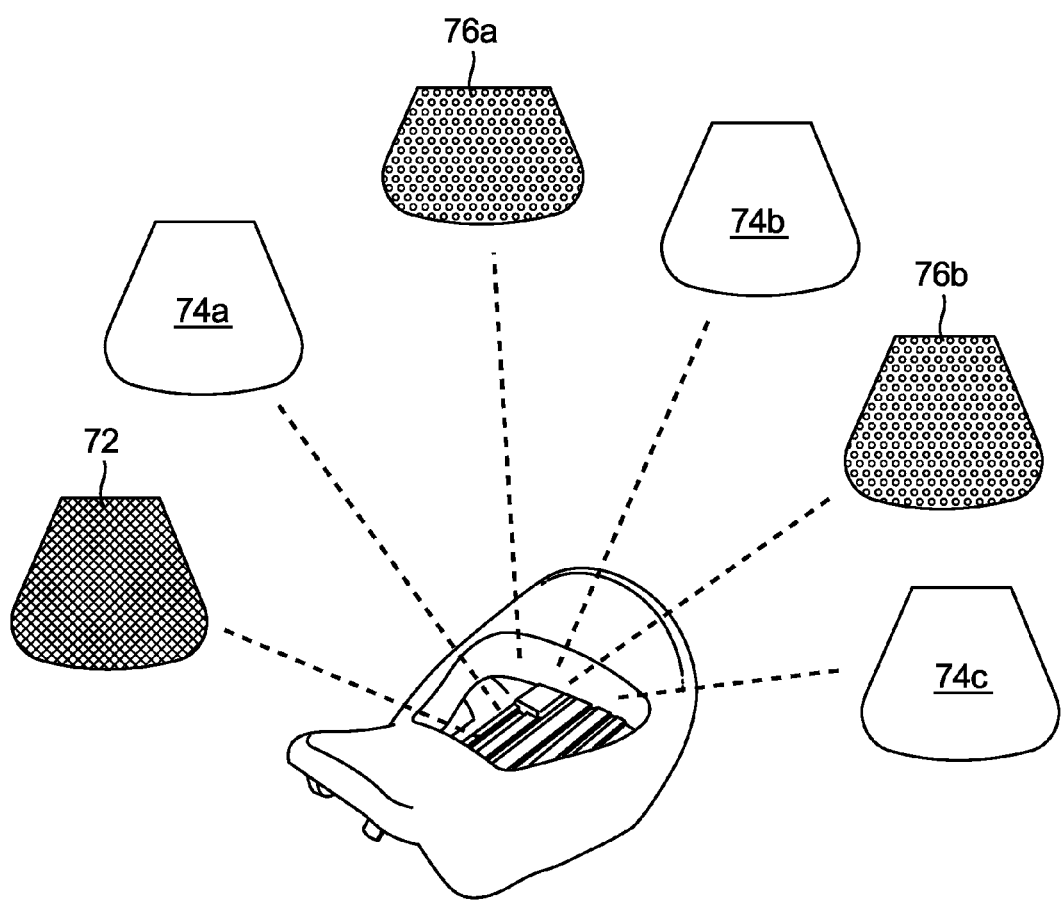
FIG. 10D is an exploded view of the decoupler of the saddle.
Figure 10E:
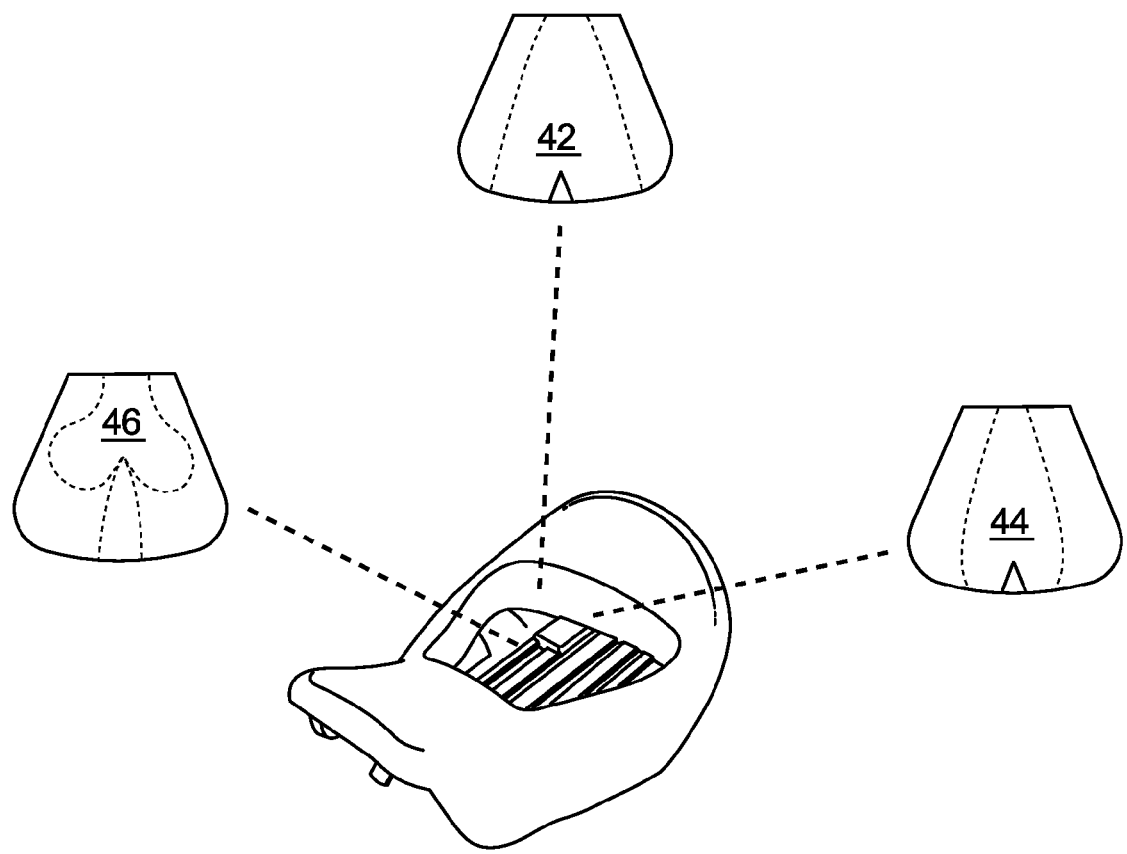
FIG. 10E is an exploded view of the cradle layers of the saddle.
Figure 10F:
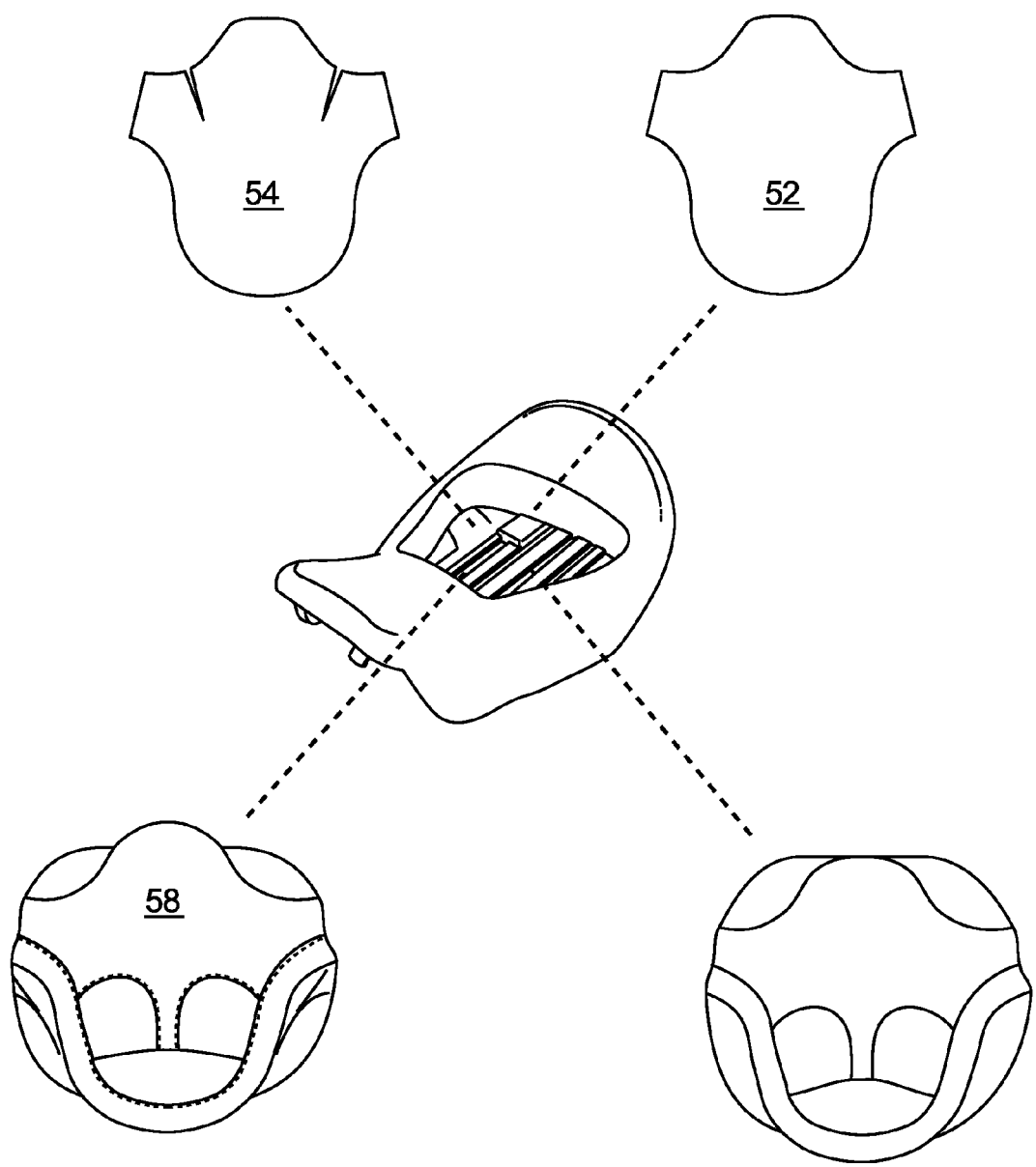
FIG. 10F is an exploded view of the cover of the saddle.

Referring to FIG. 10A, one may inventory the components, which may then be discussed. Typically, the pan 18 is the pan 18 of the original saddle 10. The pad 20 is excavated to form the cavity 22. This excavation 22 or cavity 22 removes a portion of the pad 20 from above the pan 18 and replaces it with a new core 30.

The cradle system 40, including cradles 42, 44, 46, are each formed in a unique ways, provides unique benefits. The cradle system 40 includes a first cradle 42 that is lowest, having bolsters 43 that are filled to increase their strength, stiffness, and support. Similarly, another cradle 44 is also provided with bolsters 45 that are filled with a supportive material. Finally, a third cradle 46 includes bolsters 47 that are filled. However, the third cradle 46 is filled in various regions throughout, including a relief region 48.

The relief region 48, includes specific instances 48a, 48b, 48c. The relief region 46a as well as the relief region 48b are filled with a foam or an expanded polymeric foam. The mechanical properties of these relief regions 48a, 48b may be selected to keep a region of free motion below the tailbone of a rider, in order to provide relief against support by the saddle 10 that may end up with shock from the road being transmitted up through the vehicle and saddle 10 to a user. In contrast, the relief region 48c is filled with a granular material in order to provide displacement thereof.

Meanwhile, the cover 50 or cover system 50 may include a liner 52 that covers substantially the entire pad 20, including the cavity 22 with its core 30 inserted therein. A barrier 54 may be formed of a suitable material to resist transport of water. For example, in certain embodiments, the actual wrapper 56 that wraps around the entire assembly of the saddle 10 may be formed of a permeable fabric.

In other embodiments, perforated, fiber-reinforced, flexible, polymeric materials may serve as the wrapper 56. To the extent that the wrapper 56 may pass liquid water, a barrier 54 may be placed under the wrapper 56 in order to provide the cover system 50 with protection against an incursion of water.

In some embodiments, the barrier 54 may be formed of a solid plastic film in some thickness that is particularly flexible. In other embodiments, the barrier 54 may be a semipermeable membrane that will pass vapor but not liquid.

Typically, the liner 52 may be formed of an expanded polymer, such as an open-cell urethane foam. The thickness of the liner 52 need not be large, and may range from about ¼ inch to about 1 inch. Typically, a thickness of about 1 inch to about ¾ inch has been found suitable. The barrier 54 is typically only a few thousandths of an inch (a few hundred microns) thick. The wrapper 56 may have padding 58 added on its under side or under surface. That padding 58 may also be provided with a certain amount of fill 59 or padding material 59. In general, materials such as the liner 52, the padding 58, and the fill 59 also serve the function to shape the saddle 10 in an attractive manner. By shaping and smoothing the saddle 10, the pleasing appearance may be maintained, despite the more complex stackup of various layers. Next, note those layers placed between the pan 18 and the cradles 42, 44, 46.

Into the cavity 22 may be placed a ring 62 or a circuit 62. Typically, the ring 62 forms a liner 62 that lines the entire wall 26 or perimeter 26 of the cavity 22. The liner 62 may typically have a thickness of be from about ⅛ to about ½ inch. Typically, it has been found that ⅛ to ¼ of an inch is sufficient to provide a degree of isolation and fit between the remainder of the core 30 and the wall 26 of the cavity 22. This provides greater ease in fitting, and also provides a degree of isolation against transmission of lateral motion and force into the edges of the core 30.

Into the ring 62 or liner 62 may be placed a roller 60. The roller 60 in the illustrated embodiment is constituted by a shape configured to fit around the geometry of the pan 18, while riding on the pan 18. The roller 60 basically provides a ball-bearing-type layer contained to isolate lateral motion. In the illustrated embodiment, a corrugated polymeric mat 63 or mat 63 rides on top of the roller 60. The mat 63 provides an interface, which will be described in more detail hereinbelow. Inasmuch as many details of the components of FIG. 10A will be discussed hereinafter, a shorter description will be provided here.

Above the mat 63 may be placed a wedge 64 toward the front 14 of the cavity 22 as an interface. This provides a reshaping of the cavity 22 in order to fit several other components it must fit within the cavity 22.

After the cavity 22 is lined with the ring 62 or liner 62 against the wall 26 of the cavity 22, and the bearing 60 or roller 60 is inserted into the cavity 22, on top of on the pan 18, the mat 63 is set on top of the roller 60, followed by a wedge 64, typically of a foam (expanded polymer) of some elastomeric type such as urethane. A platform 66 may be formed and may result in several instances 66a, 66b used similarly to provide a surface that is continuous. Typically, the platforms 66 may be formed of a particle board, such as a heavy cardboard, but may also be formed of certain polymer sheets.

It should noted that trailing letters indicate specific instances of an item designated by the reference numeral. Thus, it is proper herein to speak of a platform 66, to mean any and all platforms of a particular type. Meanwhile, specific instances shown in the illustrations may also be referred to by their specific identifiers 66a, 66b. Thus, the reference numeral 66 is the general designation whereas the trailing letter is a specific designation of an instance.

Above the first platform 66a may be damping pillars 70a, 70b separated by a stabilizer 64. The pillars 70a are connected by a contiguous connection, and provide certain instant elastic deflection, as well as delayed elastic or quasi-inelastic deflection. Thus, the pillars 70 provide isolation and vibration damping. On top of the second pillars 70b may be placed on other platforms 66b.

A sheet 74a may be formed of a closed-cell polymer, such as a polyethylene foam. A bubble sheet 76 or spring sheet 76a, 76b may be stacked, here in tandem, separated by another sheet 74b. Finally, the second bubble sheet 76b or gas spring 76b is covered with a final foam sheet 74c. Together, the stack of foam sheets 74 and bubble sheets 76 operates as a system of springs.

Each set of springs is isolated laterally, although it may respond and support axially. The deflection in a vertical direction of any sheets 74, 76 does not cause nor require a lateral deflection in any adjacent sheet 74, 76. That is, each of the sheets 74, 76 may slide with respect to one another in a lateral direction. Thus, a shear load or lateral load on any particular sheet 74, 76 will not necessarily transfer to an adjacent sheet 76, 74.

In contrast, a vertical load through one of the sheets 74, 76 will transmit to the adjacent sheets 74, 76. However, it may be delayed in time, may be spread in extent (e.g. along principle stress lines at 45 degrees), and so forth.

Figure 11:
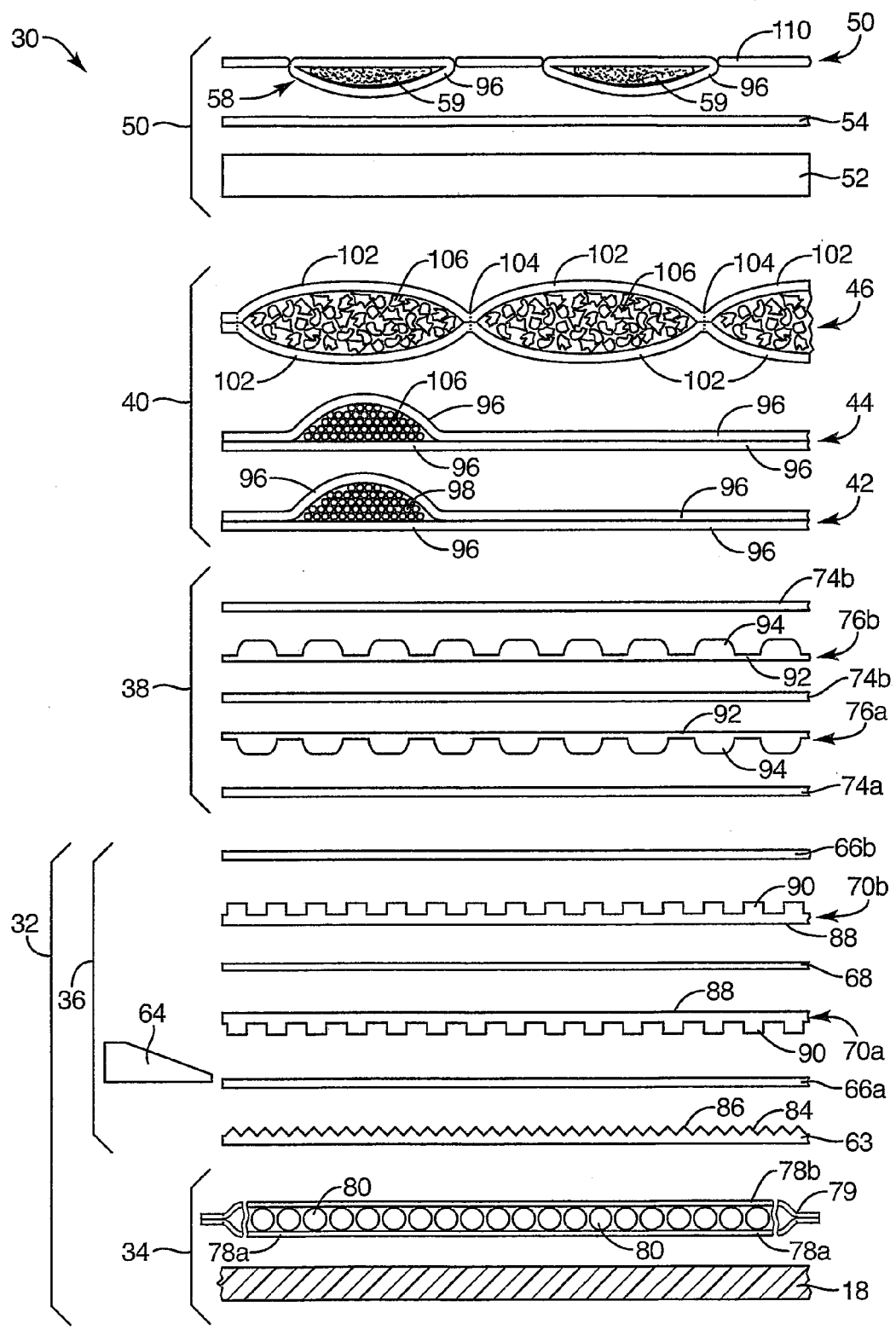
FIG. 11 is an exploded cross-sectional view of the internal components of the core.
Figure 12:
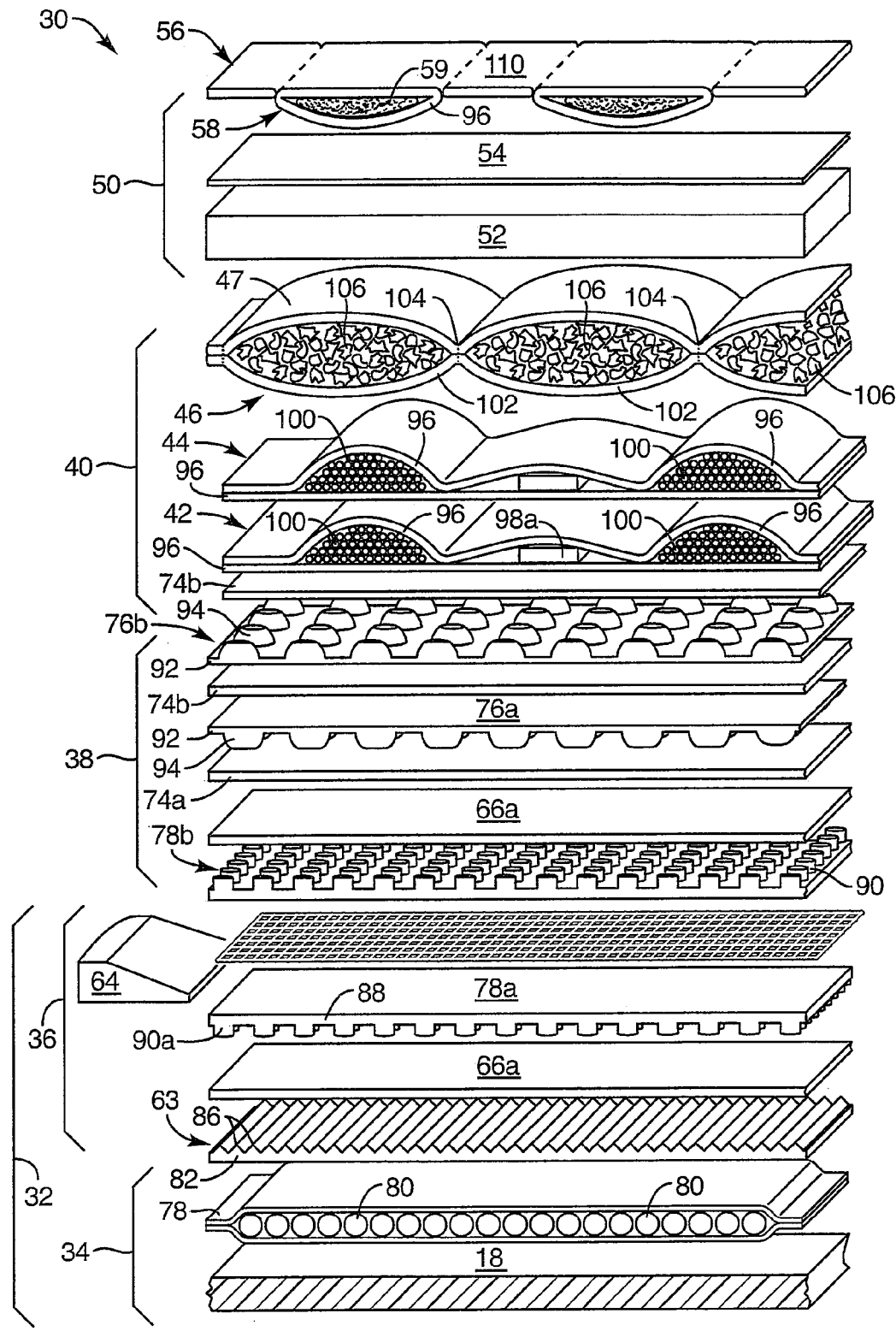
FIG. 12 is a perspective view thereof.

Referring to FIGS. 10B through 10F, with particular reference to FIGS. 11 and 12, one may see the general shape of the plan view of each component, as well as the profile views of the various materials and constructions used therein. It must be understood that the insert 30 or core 30 in accordance with the invention may be formed in a variety of configurations, and with various materials. Thus, FIGS. 10A through 10F illustrate various components in one embodiment, and groupings of components into certain functional regions.

For example, the isolator 32 does not actually include the pan 18, but the pan 18 is shown in its relationship to the other components. The ring 62 or liner 62 provides a certain amount of deflection by elements of the core 30, without significant influence from the surrounding pad 20 or the original pad 20 of the saddle 10. It also provides a certain amount of relief (tolerance, in engineering terms) for inserting the components of the core 30 into the cavity 22. A significant element of the isolator 32 is the roller 60. That is, the isolator 32 includes a disconnect 34, and a damper 36. The disconnect 34 involves the ring 62 and the roller 60 interrupting the transmission of forces in a lateral plane from the pan 18 to the remainder of the core 30 above the roller 60.

Referring to FIGS. 10A through 12, one may best understand the invention by reference to all Figures therein together. For example, FIG. 10A lays out an exploded view of all the components in one particular embodiment of a saddle in accordance with the invention. However, FIGS. 10B through 10F group each of those individual components into a particular group operating to provide a specific function. Thus, individual components within a group may change to be fewer or greater in number, but may still provide the functionality required of that group. FIG. 11 shows a representative cross sectional view in an elevation perspective of each of the layers in the illustrated embodiment. FIG. 12 shows a perspective view of the stackup of materials forming the central portion of a saddle in accordance with the invention. Thus, hereinbelow, the details of a saddle in accordance with the invention will be discussed without respect to a particular figure number, but with respect to the components, subsystems, and system. Thus, one may refer to FIG. 10A generally, FIG. 10 for the groupings, with FIGS. 11 and 12 showing the groupings, their cross sections representative of their construction, and a perspective view thereof.

In general, a saddle suitable for mounting on a motorized vehicle may include several regions, several individual components, in a variety of configurations. For example, components may be changed as to their order. Similarly, components may be changed in dimension, such as thickness, extent from front to back, as well as in the constituent material thereof.

Thus, in general, a saddle 10 or seating system 10 in accordance with the invention may be described in terms of a back 12 and front 14, as well as a top 16 which forms the seating region 16 for a user, as well as a pan 18 or bottom 18 that serves as the mechanical support for the entire saddle 10 and rider thereon as anchored by the pan to the frame of the motorized vehicle.

When a pad 20 is formed or placed on a pan 18, it may be molded or otherwise formed to have a particular shape which will be maintained in an adaptation in accordance with the invention. However, by excavating a cavity 22 and removing a removed portion 24 from the cavity, one is left with a perimeter 26 or wall 26 into which a core 30 may be inserted.

Into the core 30 will typically go an isolator 32 to isolate lateral vibration, a decoupler 34 to uncouple vertical loading from horizontal loading and displacement, as well as a cradle system 40 to support soft tissue and vector the loading from the saddle 10 in a vertical (axial) direction and lateral direction.

Together, these vector components provide more support for the skeletal structure through soft tissues, through more soft tissue, and distributed over a larger area of soft tissue. Thus, the stress that typically exists between the skeletal structure of a seated rider and the seat itself may be redistributed in a saddle 10 in accordance with the invention in order to reduce the pressure points and the stress level.

Stress is a force per unit of area to which the force is applied. Shear stress, unlike the foregoing compressive stress or tensile stress is the force from distortion laterally, and may result from a vertically applied force or from opposing, laterally applied forces on upper and lower surfaces or upper and lower regions of a material.

Likewise, deflection may be elastic or inelastic and represents deformation. Inelastic deformation is deformation that does not return all energy input. Inelastic deformation may permanent or temporary.

For example, a putty material deforms inelastically. Once deformed, it remains deformed. Materials such as "memory foam" and certain rheologically interesting materials may deform inelastically in that they return slowly to their original positions. Thus they are not effectively elastic, because they absorb energy even though eventually returning to their original positions after the load is removed.

Strain is the displacement within a material. For example, to the extent that a material stretches or collapses, that motion is strain. Strain is usually defined in terms of a unit of length per unit of length, such as inches per inch or microns per meter. Thus, a certain amount of deflection or deformation may occur within a material at a rate of so many inches or millimeters per total extent of inches or meters of material.

The principal regions of the core 30 include an isolator 32 directed to isolating vibration in a lateral direction. By lateral direction is meant a substantially horizontal direction in a side-to-side direction, or in a front-to-back direction, the reverse thereof, or the like. Thus, in general, lateral may mean sideways, while transverse may be orthogonal to a lateral direction. However, herein, lateral refers to a substantially planar motion or extent defined by an axis in one horizontal direction, and an orthogonal axis in the same horizontal plane. By horizontal, is meant the relative direction as compared to a substantially vertical direction.

A vertical (axial) direction for a rider on a motorized vehicle would be a direction away from the center of the earth or towards the center of the earth. Meanwhile, a lateral direction may be any direction within a plane perpendicular to that vertical direction. By vertical and lateral are not meant absolute directions, but general directions. That is, in general, a rider sits vertically oriented but a radial or horizontal direction that is not exactly orthogonal to a vertical direction may still be considered a lateral direction.

The isolator 32 is responsible then to isolate the pan 18 from the core 30 as to lateral motion of the pan 18. Thus, the isolator 32 tends to isolate the remainder of the core 30 from the small, powerful, and particularly high-frequency motions of the motor, the frame, and the pan 18. The pan 18 is fixed to the frame and moves in comparatively rigid body motion with the frame.

The decoupler 38 includes a variety of layers. The individual layers are typically elastic. In the illustrated embodiment, each deforms substantially entirely in an elastic deformation. In one contemplated embodiment, each of the layers in the decoupler 38 is formed of a closed-cell expanded polymeric foam or expanded polymeric material. This material is made from what is referred to in the plastics industry as a "resin" as that term is understood in that art.

Different technologies define resin differently. In plastics manufacturing technology, resin usually means a raw polymer that is then molded to become a plastic. For example, the decoupler 38 may be formed of several sheets of polymeric material formed to have permanent, closed, bubbles, each acting as a balloon. Thus, each bubble provides elastic deformation. To the extent that it is deformed vertically, it may and must deform in some other direction. Pressing down at one location in a vertical direction may cause expansion upward in a vertical direction in another area. Similarly, a generalized planar or deflection along a vertical axis may result in lateral expansion of the bubble.

A valuable feature of the decoupler 38 is the separation of layers, such that each contains no chemical or mechanical bonding with adjacent layers. Only friction, which tends to be greatly reduced by proper selection of materials, couples the layers of the decoupler 38 in a lateral direction.

In contrast, closed-cell polymeric materials of the layers of the decoupler 38 transmit substantially all loads vertically. Those loads may be redistributed outward along principle stress lines when centered at a particular location, by transmission through the various layers, each of which will, by the principals of engineering, distribute itself laterally outward as one progresses along an axis in the direction of the load.

The cradle portion 40 is valuable for several reasons. A very noticeable reason is the re-vectoring of loading. When a user sits on a saddle 10 of conventional design, soft tissues of the body have substantially no lateral support. Thus, in response to a vertical loading by the skeletal structures of a user, a rider on the vehicle, who is seated on the saddle 10, in a conventional saddle, the soft tissues have no lateral support. They may be deformed away, leaving the skeletal structure only a comparatively small area of soft tissue, close to that area of the skeletal structure itself, compressed between the skeletal structure and the saddle.

In contrast, in an apparatus and method in accordance with the invention, a saddle 10 may include a cradle 40, which may be manufactured in multiple parts as multiple cradles 40, that each include a bolster portion at the outer extrema. A bolster will cradle the soft tissues of a user with a comparatively firm outer perimeter, and a comparatively compliant central portion.

Thus, the cradles 40 and particularly the bolster portions of the cradles 40 tend to redirect the loading of the seat 10 or saddle 10 against the user. They redirect the loading of the user into the saddle 10 to have a vector component directed laterally inward as well as one directed vertically.

The cradles 40 tend to capture and contain, according to conservation-of-mass principles, the soft tissues, thereby rallying them in support of the skeletal structures. The skeletal structure is supported by a larger volume and area of soft tissue. This results in the soft tissue, in turn, distributing the loading of the weight of the rider across a greater area of the core, and the saddle 10 generally. Ultimately, a cover 50 envelops the entire pad 20 and core 30. This includes the isolator 32, the decoupler 38, and the cradle 40.

Returning now to elaborate on further details, the isolator 32 includes two distinct portions. A disconnect 34 has a principal responsibility to literally disconnect lateral loading from vertical loading, vertical motion, or both that may be transmitted from the pan 18 into the core 30. The disconnect 34 includes rollers 60. The roller layer 60 includes container walls 78, which may be a fiber-reinforced or fabric-reinforced polymeric material that is comparatively thin and flexible. It does not extend substantially in a lateral direction, but may bend or flex in a vertical direction.

The container wall 78 may be stitched 79 together, to contain a layer of bearings 80. A single layer of bearings 80 seems to function best. That is, the bearings 80 may roll on the container wall 78. For example, the pan 18 may move laterally, thus drawing a lower container wall 78 therewith. Meanwhile, the remainder of the core 30 sits on top of the upper container wall 78, isolated from the lower container wall 78 by the bearings 80. Thus, the comparatively short but powerful motions of the pan 18 in vibration are isolated from the remainder of the core 30 above the roller layer 60.

The isolator 32 also includes a damper portion 36. The damper portion 36 may be formed in one or more layers. Again, in one embodiment of an apparatus in accordance with the invention, a damper 36 may include a mat 63.

In one embodiment, the mat 63 may actually be formed to have a base 82 with tapering or tooth-shaped pedestals 84 extending away from the base 82. Each of the pedestals 84 may terminate in a peak 86 or point 86. In one embodiment, the mat 63 may be laid down flat or substantially flat on the roller layer 60. The pedestals 84 tend to isolate motions and deformations proximate the pedestals 84, due to their sparse nature. That is, the spaces between the peaks 86 can receive deformations of material, and tend to provide expansion room or deformation room for distortions of materials.

In certain embodiments, the mat 63 may be formed of a selected polymeric, and typically an elastomeric material. By polymeric material is meant the conventional definition of a polymer made up of long chains of individual mers. Thus, a mer is a building block which may be bonded to other mers in order to form a polymer. Polymers are typically formed of long chains of chemical structures. Chains may be cross linked entirely, substantially, minimally, or not at all. Thus, polymers may be rigid, comparatively speaking, or may be elastomeric. Elastomeric polymers tend to have comparatively large deflection or strain at comparatively lower loading (stress). Rigid polymers tend to have comparatively smaller strain even at substantially, comparatively larger loading or stresses.

The mat 63 may support other components of a damper 36. For example, platforms 66a, 66b may bound pillars 70a, 70b or pillar material 70a, 70b. In the illustrated embodiment, the pillar materials 70a, 70b are each directed outward from their base material 88. Meanwhile, their base material 88 has individual pillars 90 extending therefrom, each substantially independent, and only connected through their base 88.

A stabilizer 68, which is formed of a comparatively rigid polymer mesh 68, provides some mechanical load transmission between the bases 88 of the pillar materials or pillar layers 70a, 70b. However, it also provides expansion space (in the openings) to absorb distortion or expansion of the base 88.

Meanwhile, the individual pillars 90 are captured by the platforms 66a, 66b. The platforms 66 resist penetration, and stabilize the pillars 90 of the pillar layers 70a, 70b in a vertical direction. Nevertheless, the platforms 66 also provide a stability in a lateral direction. Thus, the pillars 70a, 70b may move individually, but will tend to move together, or deform together, as the platforms 66 define the planar extent of the extreme tips of the pillars 90.

Thus, in general, the platforms 66a, 66b are isolated from each other against lateral displacement, because the pillars 90 tend to be comparatively taller, and spaced apart. That is, when one of the platforms 66a, 66b is moved laterally, such as by movement of a user thereabove, or by a movement of the pan 18 therebelow, the other of the platforms 66a, 66b will not necessarily move the same amount, and will not at the same time. This is because the pillar layers 70a, 70b are formed of material that deforms elastically and inelastically.

In certain embodiments, this material absorbs a certain amount of the energy transmitted into it. Moreover, the material is comparatively soft, and deforms in response to loads, according to conservation-of-mass principles. For example, a vertical load on a vertically oriented pillar 90 results in the pillar decreasing in length, and expanding in diameter. Likewise, a displacement horizontally of an outer tip of a pillar 90 in one direction while the base 88 is displaced in an opposite direction, results in the pillars both bending, distorting, and tilting. Thus, the pillars 90 may deflect in response to lateral loads as well as vertical loads.

However, vertical loads will require that the pillars 90 deform, and hence, reduce in length, with the consequent expansion in diameter, in order to maintain a conservation of mass. That is, when material is driven to reduce in size in one direction, if it is a solid or "incompressible liquid" material, then it must expand in another dimension. This is not necessarily true for gases, which may rise in pressure. Typically, solid and liquid materials do not shrink in volume without excessive, comparatively speaking, loads.

The pillar layers 70a, 70b may be formed of a material that also absorbs energy, and does not return it elastically. For example, energy may be dissipated within the pillars 90 and base 88, and not be transmitted at all. Nevertheless, the deformation will typically be undone or restored to the original shape. However, this may not occur until loads are removed, and may typically result more slowly than the deformations were put into the pillars 90 and base 88. Thus, the pillar materials 70a, 70b tend to provide vertical isolation as well as lateral isolation of deformation, and energy.

Thus loads, forces, pressures, and the like may be absorbed and redistributed. The platforms of 66a, 66b also have a tendency to redistribute loads. However, the platforms 66a, 66b may be formed of a simple particle material that has been consolidated. For example, this may be wooden chip board, a cardboard, or a polymeric layer. The platforms 66a, 66b may be comparatively rigid, but in certain embodiments are somewhat flexible. In the illustrated embodiment, cardboard having a thickness of less than 1/16 inch (1 millimeter) has been shown to be suitable.

A wedge 64 may be placed on the mat 63, or may be abutted to the mat 63 toward the front 14 within the cavity 22. A significant function of the wedge 64 is to provide an adaptation between the pan 18 and the various layers within the core 30. That is, the materials positioned closest to the pan 18, may typically be shorter in length, due to a rise in the pan 18 as it adapts from the top 16 of the seat to the front 14 to the seat. Typically, a substantial rise accommodates an angled orientation of structural members of the frame, the fuel tank, or both in a motorized vehicle bearing a saddle 10 in accordance with the invention.

The wedge 64 may typically be formed of an open-cell, elastomeric polymer. A urethane foam having a stiffness and strength comparable to that of the pad 20 may be suitable. In other embodiments, a lesser resistance to deflection may be preferable. Also, the wedge 64 is a separate component from the pad 20, and thus does not need to deflect with the pad or as the pad does, but may operate independently. In some embodiments, the wedge 64 may also support the edges of certain layers stacked up in the core 30. It underlies other layers, and thus supports them, but permits axial deflection in response to loading. By axial is meant vertical, wherein the lateral direction would be radial with respect to the axial direction.

The decoupler 38 may include multiple layers, and the illustrated embodiment shows several of them. For example, several spring sheets 74, 76 may be stacked together. In the illustrated embodiment, an initial spring sheet 74a may be formed of an expanded polyethylene polymer. Typically, this is a closed-cell foam that deforms elastically. The material deforms more in an axial or vertical direction, because the bubbles tend to be distributed through the sheet 74a in a thinner layer.

In contrast, expansion in a lateral direction or compression therein is more difficult. This is not only because of the strength of the polymeric material, but because there is really only the interaction with the ring 62, and the pad 20 to transmit loads from the motorized vehicle into the spring sheets 74.

Above the spring sheet 74a may be a bubble sheet 76a. The bubble sheet 76 is typically formed to have a more-or-less planar base 92, on which is bonded to another layer 94 of bubbles 94 that extend away from the base 92. Thus, the base 92 is substantially inextensible such as a PET, while the bubbles 94 may typically be formed of a softer or thinner material, such as a polyethylene, that is more easily deflected. It may be deformed vertically, or expanded horizontally (radially, laterally) in response to vertical loading.

The bubbles 94 are separated from one another in order to provide expansion space for the bubbles 94 in response to loading. Likewise, the bubbles may operate like parallelograms with the top surfaces of the bubbles 94 displacing from the base 92 in a lateral direction. Just as the pillars 90, bubbles 94 may deflect laterally, thus isolating the top portion thereof from the bottom portion thereof with respect to radial or lateral deflections.

The bubble sheet 76a may be separated from another bubble sheet 76b by an intermediate spring sheet 74b. The bubble sheet 76b may operate exactly as the bubble sheet 76a, but may be oriented in the same direction, or a different direction. That is, the bubbles 94 may be oriented upward, downward, or in opposite directions on the two bubble sheets 76a, 76b.

Meanwhile, the spring sheets 74a, 74b, 74c in the illustrated embodiment, may actually be identical to one another. For example, each may typically have a thickness of from about ⅛ inch (3 millimeters) to about ¼ inch (6 millimeters) and extend laterally throughout the cavity 22. The bubble sheets 76a, 76b typically have bubbles that extend from about ⅛ inch (3 millimeters) to about ¼ inch (6 millimeters) away from the base 92.

One may consider all of the sheets 74, 76 as spring sheets. That is, each may deform elastically in a vertical direction. Each is isolated from any chemical or mechanical linkage in a lateral direction, other than by normal friction. Polyethylene tends to be a comparatively "slick" or "frictionless" material. Against itself, or against many other materials, polyethylene provides a very low coefficient of friction.

Likewise, the bubble sheets 76 may be formed of a material such as polyethylene teraphthalate (PET), which is often sold under the trademark MYLAR™. This may serve as a good or suitable base 92. In other embodiments, different densities of a polyethylene (PE) polymer may be used. Typically, the bubbles 94 may be formed of a polyethylene material. Other polymeric or elastomeric materials may likewise serve. Thus, it may be proper to speak of all the sheets 74, 76 as spring sheets.

However, the sheets 74 differ in that they provide a substantially continuous and contiguous sheet 74 of enclosed bubbles, each of which may not distort laterally without influencing its laterally adjacent, neighboring bubble. In contrast, the bubbles 94 in the sheets 76 may distort and deflect laterally and vertically, without influencing adjacent bubbles 94 within their respective sheets 76, due to the interstitial spaces between adjacent bubbles 94. Meanwhile, the sheets 74 will transmit vertical loads therethrough. Likewise, the bubbles 94 of the bubble sheets 76 will transmit vertical loads therethrough. Nevertheless, according to the principles of engineering, each will tend to distribute a load applied at any point along principal stress lines that expand and distribute the load with progress in an axial (vertical) direction.

The cradle system 40 is formed to accomplish several distinct functions. To do so, it may be formed as a single cradle 40. However, in the illustrated embodiment, the cradle 40 is actually constituted by three cradles 42, 44, 46. The first cradle 42 may include a cover 96. In the illustrated embodiment, the cover 96 is an enclosed, sewn or stitched material. That material may typically be a fabric-foam, bonded material.

For example, fabrics, whether woven or non-woven may be bonded to open-cell, expanded, polymers. These are referred to colloquially as foams. This is a different foam than fire suppression foam or shaving foam, or ocean foam. It is not actually foam, but is a foamed polymer or an expanded polymer as described hereinabove.

A thin layer of polyurethane, open-cell foam may be about ⅛ inch thick, and may be bonded to the fibers of a fabric backer, which tends to stabilize the dimensions of the foam. Two layers of this may be sewn together.

In the illustrated embodiment, the cover 96 has a bolster region 43 that is filled. Meanwhile, the region outside of the bolster 43 is not. The fill material 98 captured by the cover 96 is resin beads. These beads may be polypropylene, polystyrene, polyethylene, or the like. These beads 98 or this fill material 98 may be granular in nature.

A dimension of about ⅛ inch effective diameter (hydraulic diameter is an effective diameter, and is four times the area divided by the perimeter) or two millimeters has been effective. The fill 98, as to each granule, is solid, and substantially undeformable. That is, very large stresses or forces, far larger than can be provided by a user seated on the saddle 10 would be required to provide any appreciable, visually detectable deformation in any granule of the fill 98.

Nevertheless, because the fill 98 is granular in nature, the resin beads 98 may displace in response to loads. Thus, if a comparatively larger load is applied at a particular point, the fill 98 will move aside, making way for penetration by the load, until the increase in support area is sufficient that the fill 98 may support the load. Thus, the fill 98, as a granular material, tends to redistribute loads. In the illustrated embodiment, the load is redistributed to contain soft tissue of a user and provide a lateral component of force, rather than simply a vertical component of supporting force.

A wedge 48a may be provided near the back center region of the cradle 42. The wedge 40b may be formed of a comparatively soft foam that provides ready deflection and response to load. The entire column under the tail bone skeletal structure of a user is devoid of the most resistant materials in the saddle 10. In this way, the shock and pressure of continuous and intermediate loading that may be transmitted from the road through the suspension and frame into the saddle 10 are not translated into this particular skeletal extremity.

This is a major cause in conventional seats of discomfort, pain, and back injury or spinal injury to riders, the transmission to axial loads from the frame and saddle into the tail bone of a rider. A saddle 10 in accordance with the invention provides the wedges 48 in each of the cradles 42, 44, 46 in order to relieve force by displacing readily, or otherwise and redistributing any loading that might otherwise be transmitted to this skeletal structure.

The bolsters 43, 45, 47 corresponding to each of the cradles 42, 44, 46, respectively, may be formed to be of any suitable thickness. However, in the illustrated embodiment, the dimensions of the bolsters 43, 45, 47 are selected to provide a stackup dimension of the core 30 that fits within the envelope of the cavity 22. The relative proportions of the bolsters 43, 45, 47 with respect to one another may be modified by design.

The cradle 44 may again rely on a cover 96 similar to that of the cradle 42. Meanwhile, the bolsters 45 will typically extend further inboard than do the bolsters 43 of the cradle 42. Typically, the bolsters 43 constitute less than about ¼ of the width of the cradle 42. In contrast, the bolsters 45 of the cradle 44 each constitute about ⅓ of the overall width of the cradle 44.

Also, the fill 100 in the bolsters 45 tends to be or is selected to be more displaceable and deformable. For example, it has been found that an expanded polystyrene (EPS) bead, which is formed substantially spherically, operates to provide elastic deflection. Whereas, appreciable elastic deflection was not effectively present in the fill 98 of resin beads 98, the fill 100, when formed of EPS beads does have the capacity for deformation within the range of the loads imposed by a rider.

Nevertheless, a principal form of displacement of the fill 100 is to move away from a point load, as a beanbag would redistribute load by deformation of the bean bag. The bolsters 43, 45 tend to redistribute load, rather than transmit it vertically. Thus, they will deform to re-vector loads, spread them out, and provide lateral support to soft tissues. By deforming, a cradle 40 contains the soft tissues and re-vectors the loads from purely vertical, to have components both vertical and lateral to support skeletal structures with greater area and volume or mass of soft tissue.

The cradle 46 may be provided with bolsters 47, which may extend through and around the sides and back portions of the cradle 46. Meanwhile, a wedge 48c like the wedges 48a, 48b is provided. However, the wedge 48c may contain a fill material 106. Meanwhile, the fill material 106 is maintained within the bolsters 47 by stitching 104. The stitching 104 tends to maintain distribution in the cradle 46, whereas stitching in the cradles 42, 44 keeps material away from the center region.

By contrast, the cradle 46 contains fill material 106 also in the central region between the bolsters 47. Also, the same fill material 106 may be used in the wedge region 48c. The wedge regions 48, or relief regions 48, operate differently between the cradles 42, 44, 46.

For example, in the cradle 46, redistribution of load as described hereinabove with respect to the granular materials in the cradles 42, 44 operates in the cradle 46. However, redistribution occurs throughout the cradle 46.

In certain embodiments, the thickness of the fill 106 within the central region between the bolsters 47 may be comparatively thinner. In other embodiments, it may have substantially the same thickness. Typically, the cover material 96 in the cradle 44 may be thicker, and may have a vertical dimension of from about ¼ inch (6 millimeters) to ½ inch (12 millimeters). Typically, an open-cell, elastomeric, expanded polymer may be used. A urethane foam have been found suitable. Thickness is on the order of ¼ or ½ inch (6 millimeters or 12 millimeters) has been suitable.

This is a comparatively compliant material, and deforms readily with a minimal force. However, the stiffness of the foam may be controlled with all polymers by proper selection of the mechanical properties of the polymer that forms the foam. Thus, very soft and extendable elastomers may be used. Very low densities (as defined in the art) may be used. Very high densities, with small interstitial spaces, and comparatively stiffer polymers may be used. However, these may be designed according to the desires of a user, to be softer, or stiffer. Likewise, the densities thereof may be so selected according to the desires of a user or designer.

The fill material 100 may be of any suitable type, but is vermiculite in the illustrated embodiment, vermiculite does not have the same regular and rounded shape that the fill materials 98, 100 have. Accordingly, it tends to engage other particles more, and distribute less, thus it forms more engagement vertically and laterally than do the other fill materials 98, 100. Nevertheless, with loading, it does tend to deflect, much as expanded polystyrene, and will slip between granules, and thus redistribute load, but to a lesser extent.

A cover 50 may include a liner 52 such as a selected open-cell, expanded elastomeric polymer. A suitable urethane foam of suitable density and stiffness with a dimension selected to fit a saddle 10 may be left to the design choices of a user or manufacturer. It has been found that a thickness of from about ½ to about 1 inch has been suitable. The liner 52 is typically cut from a sheet of stock, in a unique shape as illustrated, in order to be folded around the saddle 10, and particularly around the pad 20.

The liner 52 tends to cover and contain the core 30 along with the pad 20, and also serves to fill out the shape in order to obscure the presence of the disparate regions of the pad 20 and core 30. Meanwhile, a barrier 54, such as a water barrier may be formed of a polymeric material, that is completely impervious, or is semi-permeable. TYVEK™ brand semi-permeable material will permit the passage of vapors and resist (to a very high pressure) the passage of liquids. Accordingly, a TYVEK™ material may be suitable for the barrier 54. In other embodiments, polyethylene, polypropylene, or other films on the order of a few thousandths (few microns) of thickness may be suitable, sufficiently flexible, and durable for resisting the incursion of water into the open-cell materials therebelow.

Ultimately, a cover 50 may include a wrapper 56. The wrapper 56 may include simply a skin 110 or an outer layer 110. However, in other embodiments, additional padding 58 may be added. In the illustrated embodiment, the padding 58 is formed of the same open-cell expanded elastomeric polymer, in a fabric-bonded configuration has been shown suitable for the padding 58. It has dimension of about ⅛ inch thickness (3 millimeters) and is bonded to a thinner layer of fabric.

In the illustrated embodiment, additional padding 59 includes a material, such as an elastomeric foam, having a comparatively soft deformability. The skin 110 may be formed of leather, a knit fabric, a synthetic leather, such as a Naugahyde™ or other fabric-reinforced polymer layer.

What is claimed and desired to be secured by United States Letters Patent is:

1. A method for manufacturing a saddle, the method comprising:
   providing an original saddle configured for a vehicle and having a loading region configured to provide support when a rider is seated thereon;
   removing cover material;
   providing a cavity defining a core in the loading region;
   inserting within the cavity an isolator comprising a disconnect isolating lateral motion between a pan of the original saddle and the loading region above the pan, and a damper portion tending to isolate lateral motion between the core and the pan, vertical motion between the core and the pan, and absorb and dissipate energy associated therewith;
   a decoupler comprising layers transmitting vertical loading and isolating lateral loading between one another;
   a cradle containing a central region positioned to support skeletal structures of a seated rider and a bolster portion outboard thereof and supporting soft tissue surrounding the skeletal structures to relieve stress; and
   applying a cover system to enclose an original pad and the core.

2. The method of claim 1, further comprising providing rollers intermediate the pan and the core isolating lateral relative motion therebetween.

3. The method of claim 2, further comprising providing a stabilizer between two arrays of pillars disposed above and below the stabilizer, the pillars formed of a polymer providing elastic deformation and inelastic deformation in response to lateral motion and vertical motion.

4. The method of claim 3, further comprising providing spring sheets comprising closed-cell, expanded polymeric, sheet material providing elastic deformation in a vertical direction, and isolated from one another to resist transmission of lateral displacement.

5. The method of claim 4, further comprising providing a container containing the rollers and applying transmitted forces in a vertical direction to the rollers, while rolling in non-slipping contact with the rollers.

6. The method of claim 5, further comprising providing a spring layer comprising elastically deforming bubbles distributed throughout a substantially planar region and provided with spaces intermediate to bubbles in which the bubbles may deform and expand laterally in response to deflections imposed vertically thereon.

7. The method of claim 6, further comprising providing bolsters in the cradle, the bolsters comprising a flexible and deformable covering in a laterally extreme portion, filled with a comparatively incompressible, granular material displaceable and deformable as a mass, but substantially non deformable as individual granules.

8. The method of claim 7, further comprising providing a plurality of cradles, each comprising a container extending throughout a horizontally disposed lateral region and containing a fill material in a bolster region thereof, the fill materials for each cradle being distinct from those of the other cradles.

9. The method of claim 8, further comprising providing the rollers as the disconnect and the pillars as a damper of the isolator.

10. A method for manufacturing a saddle, the method comprising:
providing a saddle for a vehicle, the saddle having a pan, providing a rigid support, and a loading region thereabove, configured to provide support under a rider when seated thereon;
removing a cover material;
providing a cavity defining a core in the loading region;
inserting within the cavity a core comprising
an isolator comprising a disconnect isolating lateral motion between the pan and the loading region,
a damper tending to isolate relative motion between the core and the pan and absorb and dissipate energy associated therewith,
a decoupler comprising layers transmitting vertical loading and isolating lateral loading between one another, and
a cradle containing a central region positioned to support skeletal structures of a seated rider and a bolster portion outboard thereof and supporting soft tissue surrounding the skeletal structures to relieve stress; and
applying a cover system to enclose an original pad and the core.

11. The method of claim 10, wherein the decoupler comprises rollers intermediate the pan and a remainder of the core above the decoupler.

12. The method of claim 10, wherein the damper comprises arrays of pillars formed of a polymer providing elastic deformation and inelastic deformation in response to lateral motion and vertical motion.

13. The method of claim 10, wherein the core further comprises a sheet material providing elastic deformation in a vertical direction and slippage in a lateral direction.

14. The method of claim 10, wherein the decoupler comprises rollers intermediate the pan and a remainder of the core above the decoupler, the rollers being contained within a containment to transmit vertical forces and rolling laterally in response to lateral forces.

15. The method of claim 10, further comprising providing a spring layer comprising elastically deforming bubbles distributed throughout a substantially planar region and provided with spaces intermediate to bubbles in which the bubbles may deform and expand laterally in response to deflections imposed vertically thereon.

16. The method of claim 10, further comprising providing a cradle having a central support region and a bolster outboard from the central support region to provide support in a direction toward the central support region.

17. The method of claim 10, further comprising providing rollers operating as the isolator and pillars operating as the damper.

* * * * *